Sept. 13, 1960  N. A. APPLETON  2,952,488
CLOSURE MEMBER FOR CONDUIT FITTINGS
Filed May 8, 1956
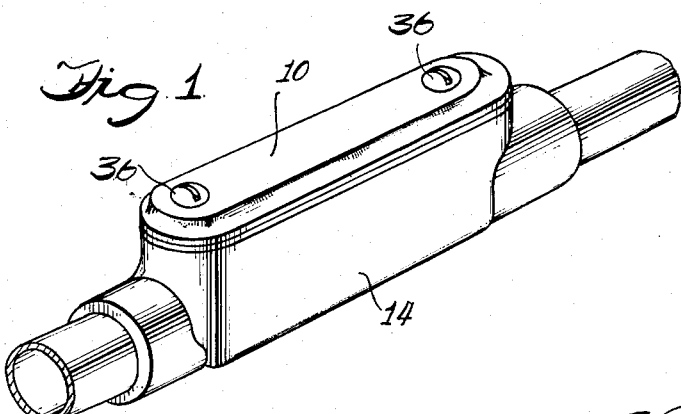
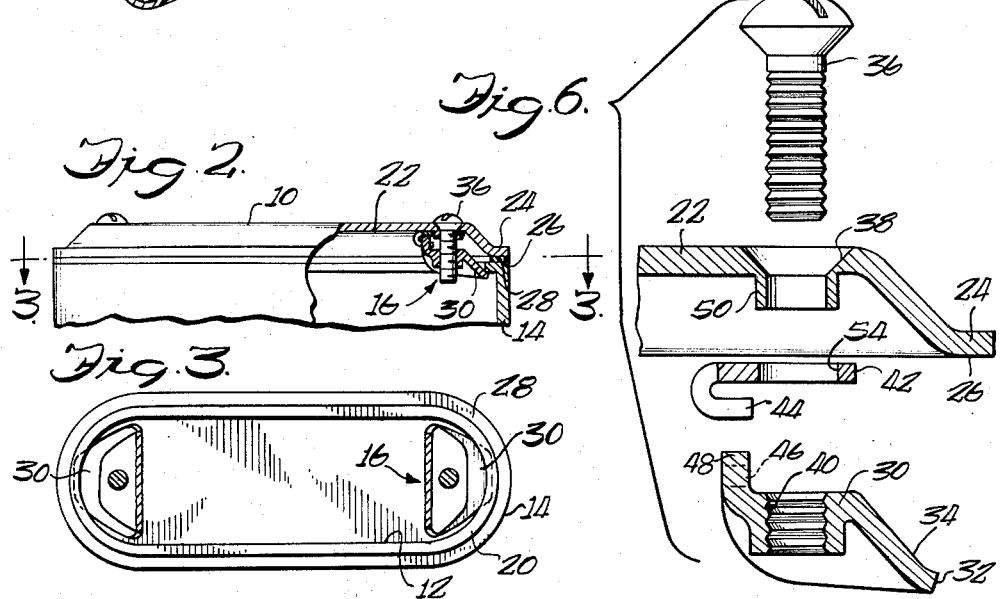
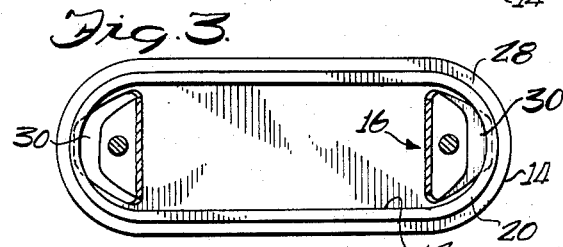
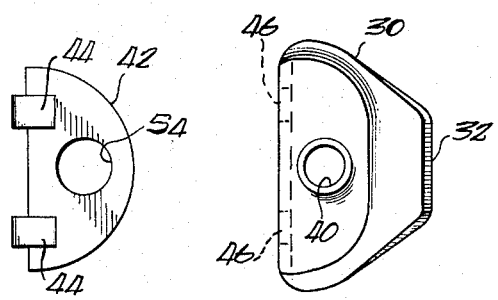
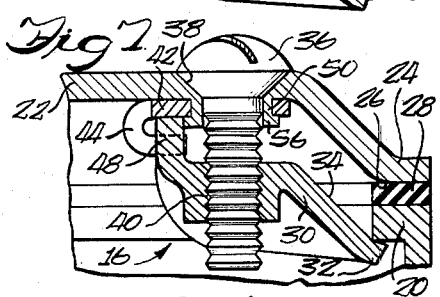
Inventor
Norton A. Appleton
By Carlson, Pitzner, Hubbard & Wolfe
Attorneys

United States Patent Office 2,952,488
Patented Sept. 13, 1960

2,952,488
CLOSURE MEMBER FOR CONDUIT FITTINGS

Norton A. Appleton, Chicago, Ill., assignor to Appleton Electric Company, Chicago, Ill., a corporation of Illinois Filed May 8, 1956, Ser. No. 583,513

3 Claims. (Cl. 292—256.73)

The present invention relates generally to closure members for the access apertures of conduit fittings and the like. More particularly, the invention relates to a novel clamping arrangement for detachably securing such closure members in place on the fittings.

The principal object of the present invention is to provide a simple closure member which is susceptible of secure and rapid installation on conduit fittings.

Another object of the present invention is to provide a closure member of the type set forth and including a self-contained clamping arrangement which eliminates the tedious and costly job of engaging various small, loose parts for securing the closure to the fittings.

A further object of the invention is to provide a closure member which is self-centering when placed over the access opening of a conduit fitting and tightened thereto.

Still another object of the invention is to provide a clamping arrangement which is simple and reliable and yet susceptible of rapid and economical manufacture.

Still a further object of the invention is to provide a method of rapidly manufacturing the cover and clamping arrangement of the above type and with a minimum of operational steps.

Other objects and advantages will become apparent to those skilled in the art as the following detailed description proceeds, taken in connection with the accompanying drawing wherein:

Figure 1 is a perspective view of a conduit fitting having a closure member, embodying the invention, secured in place thereon.

Fig. 2 is an elevation view, partly in section, of the conduit fitting and closure member illustrated in Fig. 1.

Fig. 3 is a top plan view, partly in section, taken substantially in the plane of line 3—3 of Fig. 2 and a conduit fitting having a closure therein with a portion of the closure cut away.

Fig. 4 is an enlarged plan view of the keeper.

Fig. 5 is an enlarged plan view of the clamping dog.

Fig. 6 is an enlarged, fragmentary, elevational view, partly in section, showing the clamping arrangement embodying the present invention prior to assembly.

Fig. 7 is an enlarged fragmentary elevational view, partly in section, showing the conduit fitting, closure member, and clamping arrangement in assembled relation.

While the invention is susceptible of various modifications and alternative constructions, an illustrative embodiment has been shown in the drawing and will be described below in detail. It should be understood, however, that there is no intention to limit the invention to the specific form disclosed, but on the contrary, the intention is to cover all modifications, alternative constructions, and equivalents falling within the spirit and scope of the invention as expressed in the appended claims.

Referring now to the drawing, there is shown in Figs. 1 and 2 an illustrative closure member 10 adapted to cover the access opening 12 of a conduit fitting 14. A clamping arrangement 16 is provided at each end of the cover 10 (Fig. 3) on the inner surface thereof and in a position for engaging the end walls of the fitting 14 adjacent the opening 12.

In the particular fitting shown, the walls are expanded into an oblong box-like form having a flat outer face through which the aperture 12 is cut to provide access to the fitting interior for pulling cables, making connections, or otherwise working on the wiring contained therein. The opening 12 is, of course, made somewhat smaller than the outer face of the fitting 14 so as to leave a relatively flat marginal edge portion 20 around the periphery of the access opening 12.

The closure member 10, on the other hand, is organized upon an oblong cover plate 22 of appropriate size to overlie the above described marginal portion 20 surrounding the access opening 12. To enhance the sealing action of the closure 10, the peripheral portion 24 of the plate 22 is laterally offset from the general plane of the closure, thus defining a relatively narrow sealing surface 26. To further enhance the sealing action of the cover 10 against moisture and weather, the plate 22 is provided with a suitable sealing gasket 28 (Figs. 2 and 7) adapted to be interposed between the outer face of the fitting and the sealing surface 26 of the cover.

In order to detachably secure the closure member 10 in place over the opening in the fitting 14 and in a properly oriented position thereon, each of the clamping means 16 includes a pair of semi-cup-shaped dogs 30 (Figs. 5–7) having a tongue 32 thereon adapted to engage the inner surface of the flat, marginal edge 20 of the fitting. The external peripheral surface 34 of the dog 30 is formed so as to substantially conform in shape to the ends of the access opening 12 against which it is engaged when the cover 10 is placed on the fitting 14 (Fig. 3). In the present instance, the cup-shaped dogs are releasably secured to the under surface of cover plate 22 by means of a tightening screw 36 projecting through an opening 38 in the plate 22 adjacent each end thereof. Each of the dogs is provided with a central threaded opening 40 for the reception of the screw so that the dog can be tightened or loosened relative to the cover and fitting.

Provision is made for preventing the rotation of the dogs when the screw is turned and for precluding the loss thereof when the screw is loosened. This is accomplished by means of a keeper 42 (Fig. 4) secured to the inner surface of the cover plate 22 (Fig. 7). One end of the keeper 42 is bifurcated to provide a pair of parallel prongs 44 adapted to engage in suitable openings 46 in the inner end 48 of the dog 30 (Fig. 6). The inner end 48 of the dog 30 is positioned at approximately a right angle to the body thereof so as to engage the keeper 42 attached to the underside of the cover plate 22 and serves as a fulcrum upon which the dog may rock when the tightening screw is rotated. It can easily be seen that, when the cover is in place on the fitting, tightening of the screws will cause the dogs to engage the marginal edge 20 of the fitting to securely hold the cover 10 in place thereon.

In order to mount the keeper adjacent the cover plate 22, a pair of hollow rivet or grommet members 50 (Fig. 6) are integrally formed on the plate 22 when each of the screw holes 38 are punched therethrough for the reception of the respective clamping screws 36. The keeper 42, forming a part of each clamping arrangement 16, is rigidly secured to the cover plate 22 by inserting the grommet 50 through a corresponding aperture 54 in the keeper and peening it into flange 56 (Fig. 7) which grips the keeper.

The use of this method of attaching the keeper to the cover plate substantially simplifies the closure construction because the hole for the clamping screw is punched through the cover plate and the grommet 50 for attaching the keeper is formed in the same operative step. A second step, including placing the keeper over the grommet and peening the same to attach the keeper to the plate, completes the operation. These operational steps obviously can be done on both ends of the cover plate 22 at the same time. The inner end 48 of each dog 30 is then mounted on the prongs of its corresponding keeper and a clamping screw is passed through the opening in the plate and threadably engaged with the dog. If desired, the inner end of the screw may be enlarged slightly to prevent its removal from the dog after assembly therewith.

The closure member 10 is mounted in place on the fitting 14 by bringing its associated clamping arrangements 16 into registration with the access opening 12 of the fitting 14 so that the sealing surface 26 of the closure plate 22 seats upon the marginal portion 20 and gasket 28 surrounding the access opening 12. The closure member 10 can thereupon be clamped in position by simply turning each of the screws 36 in the proper direction to swing the dog 30 about the fulcrum 48 formed on the inner end thereof so that the tongue 32 engages the underside of the flat marginal edge 20. The dog 30, the outer peripheral surface 34 of which is similar in configuration to the shape of the access opening edge, will center itself in the access opening as the clamping arrangement 16 is tightened. This will, in turn, center the closure member 10 on the fitting since the keeper 42 prevents the dog 30 from rotating relative to the cover plate 22. After the cover plate has centered itself over the access opening on the fitting, the clamping screws may be tightened securely to prevent the entrance of moisture or other injurious substances to the inner compartment of the fitting.

To release the clamping devices and remove the closure member 10 from the fitting 12 it is only necessary to follow a reverse procedure to that set forth above. When the dogs 30 have been loosened sufficiently so that the tongue has swung away from the marginal edge, the cover 10 is lifted off to expose the interior of the fitting 14.

I claim as my invention:

1. A clamping device including a self-centering clamping dog for use on a cover adapted to close an oblong access opening defined in a conduit fitting by a marginal annular shoulder having arcuate end portions, said cover having a clamping screw loosely extending therethrough adjacent one end, said device comprising a keeper mounted on the inner surface of the cover and having an arm spaced from and parallel to the cover, a smoothly curved cup-shaped dog member substantially conforming in shape to the arcuate end curvature of the oblong access opening and having a smoothly rounded downwardly tapering surface terminating in a lower lip projecting outwardly and at a lesser downward inclination from said smoothly rounded surface, a threaded opening in the center of said member engaging the clamping screw, and an upwardly extending leg on the portion of the member opposite from said smoothly rounded surface and lower lip swingingly engaged with the keeper arm so that said dog swings about said keeper arm as a fulcrum when the screw is tightened and rotation of the dog is prevented, said smoothly rounded arcuate curved dog surface being engageable with the arcuate shoulder portion of the fitting so that the cover is centered over the oblong access opening and is securely clamped thereto by engagement of the lower lip against the undersurface of the marginal annular arcuate end shoulder of the fitting as the screw is tightened, said dog being restrained by said keeper to swing downwardly and inwardly when said screw is loosened so that said lip clears the shoulder portion of the fitting when the cover is removed therefrom.

2. A clamping device including a self-centering clamping dog for use on a cover adapted to close an oblong access opening defined in a conduit fitting by a marginal annular shoulder having arcuate end portions, said cover having a clamping screw loosely extending therethrough adjacent one end, said device comprising a keeper mounted on the inner surface of the cover and having a pair of arms spaced from and extending parallel to the cover, a smoothly curved cup-shaped dog member substantially conforming in shape to the arcuate end curvature of the oblong access opening and having a smoothly rounded downwardly tapering surface terminating in a lower lip projecting outwardly and at a lesser downward inclination from said smoothly rounded surface, a threaded opening in the center of said member engaging the clamping screw, and an upwardly extending leg on the portion of the member opposite from said smoothly rounded surface and lower lip having a pair of apertures therethrough corresponding to and swingingly engaged with the keeper arms so that said dog swings about said keeper arms as a fulcrum when the screw is tightened, said arms preventing rotation of the dog as the screw is turned, said smoothly rounded arcuate curved dog surface being engageable with the arcuate shoulder portion of the fitting so that the cover is centered over the oblong access opening and is securely clamped thereto by engagement of the lower lip against the undersurface of the marginal annular arcuate end shoulder of the fitting as the screw is tightened, said dog being restrained by said keeper to swing downwardly and inwardly when said screw is loosened so that said lip clears the shoulder portion of the fitting when the cover is removed therefrom.

3. A clamping device including a self-centering clamping dog for use on a cover adapted to close an oblong access opening defined in a conduit fitting by a marginal annular shoulder having arcuate end portions, said cover having a clamping screw loosely extending therethrough adjacent one end, said device comprising a keeper mounted on the inner surface of the cover surrounding said screw and having a pair of arms spaced from and extending parallel to the cover towards the screw, a smoothly curved cup-shaped dog member substantially conforming in shape to the arcuate end curvature of the oblong access opening and having a smoothly rounded downwardly tapering surface terminating in a lower lip projecting outwardly and at a lesser downward inclination from said smoothly rounded surface, said member having an enlarged body portion defining a threaded aperture engaging the clamping screw, and an upwardly extending leg on said body portion of the member opposite from said smoothly rounded surface and lower lip, said leg having a pair of apertures therethrough corresponding to and swingingly engaged with the keeper arms so that said dog swings about said keeper arms as a fulcrum when the screw is tightened, said arms preventing rotation of the dog when said screw is turned, said smoothly rounded arcuate curved dog surface being engageable with the arcuate shoulder portion of the fitting so that the cover is centered over the oblong access opening and is securely clamped thereto by engagement of the lower lip against the undersurface of the marginal annular arcuate end shoulder of the fitting as the screw is tightened, said dog being restrained by said keeper to swing downwardly and inwardly when said screw is loosened so that the lip clears the shoulder portion of the fitting when the cover is removed therefrom.

References Cited in the file of this patent

UNITED STATES PATENTS

| | | |
|---|---|---|
| 943,338 | Carter et al. | Dec. 14, 1909 |
| 1,219,217 | Arndt | Mar. 13, 1917 |
| 1,433,430 | Taylor | Oct. 24, 1922 |
| 1,767,226 | Pearson | June 24, 1930 |
| 1,777,530 | Pearson | Oct. 7, 1930 |
| 1,793,261 | Stieglitz | Feb. 17, 1931 |
| 2,099,918 | Winter | Nov. 23, 1937 |
| 2,199,683 | White | May 7, 1940 |
| 2,498,135 | Rock, Jr. | Feb. 21, 1950 |